United States Patent
Nemetz et al.

(10) Patent No.: US 11,627,863 B2
(45) Date of Patent: Apr. 18, 2023

(54) DUST COLLECTION BOX

(71) Applicant: Black & Decker Inc., New Britain, CT (US)

(72) Inventors: Uwe Nemetz, Canton (DE); Klaus-Dieter Arich, Hunstetten-Beuerbach (DE); Martin Herbst, Idstein (DE); Arther Lauer, Idstein (DE)

(73) Assignee: Black & Decker Inc., New Britain, CT (US)

( * ) Notice: Subject to any disclaimer, the term of this patent is extended or adjusted under 35 U.S.C. 154(b) by 935 days.

(21) Appl. No.: 15/869,488

(22) Filed: Jan. 12, 2018

(65) Prior Publication Data
US 2018/0199794 A1 Jul. 19, 2018

(30) Foreign Application Priority Data
Jan. 13, 2017 (GB) ..................... 1700637

(51) Int. Cl.
*A47L 25/00* (2006.01)
*B25D 17/20* (2006.01)
(Continued)

(52) U.S. Cl.
CPC ............. *A47L 25/00* (2013.01); *A47L 7/0095* (2013.01); *A47L 9/122* (2013.01); *A47L 9/20* (2013.01);
(Continued)

(58) Field of Classification Search
CPC  B01D 46/04; B01D 46/0067; B01D 46/0058; B01D 46/0068; B01D 46/0069; A47L 9/20; A47L 7/0095; B23Q 11/0046
(Continued)

(56) References Cited

U.S. PATENT DOCUMENTS 1,929,405 A  10/1933  Bilde Tord
2,204,461 A  6/1940  Zimark
(Continued)

FOREIGN PATENT DOCUMENTS

DE  4138223 C1  2/1993
DE  19517197 A1  11/1996
(Continued)

OTHER PUBLICATIONS

EP Search report dated Dec. 6, 2017 issued in corresponding EP application No. 17172353.9.

*Primary Examiner* — Joseph J Hail
*Assistant Examiner* — Robert C Moore
(74) *Attorney, Agent, or Firm* — Amir R. Rohani (57) ABSTRACT

A dust collection box for a dust extractor includes first and second air inlet chambers, an air inlet aperture through which air is drawn into the first air inlet chamber, an air outlet aperture through which air is dawn out of the second air outlet chamber, an air intermediate chamber formed in the housing, and a filter mounted within the housing. The filter includes a first part through which air passes from the air inlet chamber to the air outlet chamber, and a second part through which air passes from the air inlet chamber to the air intermediate chamber. An ambient air aperture is formed in the wall of the housing. A valve disposed proximate the ambient air aperture is switchable to connect the air intermediate chamber to only one of the air outlet chamber or the ambient air aperture.

22 Claims, 8 Drawing Sheets

(51) Int. Cl.
  *B25D 17/24* (2006.01)
  *B23Q 11/00* (2006.01)
  *A47L 9/12* (2006.01)
  *B25D 16/00* (2006.01)
  *A47L 7/00* (2006.01)
  *A47L 9/20* (2006.01)

(52) U.S. Cl.
  CPC ...... *B23Q 11/0046* (2013.01); *B23Q 11/0071* (2013.01); *B25D 16/00* (2013.01); *B25D 17/20* (2013.01); *B25D 17/24* (2013.01); *B25D 2216/0084* (2013.01); *B25D 2217/0065* (2013.01); *B25D 2250/265* (2013.01)

(58) Field of Classification Search
  USPC .......................................................... 15/352
  See application file for complete search history.

(56) References Cited

U.S. PATENT DOCUMENTS

| | | | |
|---|---|---|---|
| 3,850,200 A | 11/1974 | Flebu | |
| 4,355,659 A | 10/1982 | Kelchner | |
| 5,108,473 A | 4/1992 | Hayden, Sr. | |
| 5,400,464 A * | 3/1995 | Steiner | A47L 9/08 15/330 |
| 5,816,290 A | 10/1998 | Altshuler | |
| 5,951,746 A | 9/1999 | Treitz et al. | |
| 6,830,599 B1 | 12/2004 | McCutchen | |
| 7,082,640 B2 | 8/2006 | McCutchen | |
| 7,147,683 B1 | 12/2006 | McCutchen | |
| 7,951,214 B2 | 5/2011 | Menrik et al. | |
| 8,312,894 B2 | 11/2012 | McCutchen | |
| 8,393,048 B2 * | 3/2013 | Rentschler | B01D 46/46 15/352 |
| 8,516,654 B1 | 8/2013 | McCutchen et al. | |
| 8,677,557 B2 | 3/2014 | McCutchen | |
| 8,695,157 B2 | 4/2014 | Beskow et al. | |
| 8,726,460 B2 | 5/2014 | Jonsson et al. | |
| 8,881,342 B2 | 11/2014 | Jonsson et al. | |
| 8,940,064 B2 | 1/2015 | Hara et al. | |
| 9,271,620 B2 | 3/2016 | Meredith et al. | |
| 9,408,509 B2 | 8/2016 | Plato et al. | |
| 2004/0173510 A1 | 9/2004 | Jung | |
| 2005/0281627 A1 | 12/2005 | Britz | |
| 2007/0174993 A1 | 8/2007 | Dever et al. | |
| 2010/0293743 A1 * | 11/2010 | Beskow | A47L 9/16 15/347 |
| 2010/0306955 A1 | 12/2010 | Menrik et al. | |
| 2011/0226130 A1 * | 9/2011 | Kienzle | B01D 46/24 95/280 |
| 2013/0263405 A1 | 10/2013 | McCutchen | |
| 2014/0230931 A1 | 8/2014 | McCutchen | |
| 2014/0237763 A1 * | 8/2014 | Holsten | A47L 9/20 96/417 |
| 2015/0135475 A1 * | 5/2015 | Foenss | A47L 9/1409 15/347 |
| 2016/0227974 A1 | 8/2016 | Meredith et al. | |
| 2018/0281004 A1 * | 10/2018 | Nilsson | A47K 5/14 |
| 2019/0247991 A1 * | 8/2019 | Hartmann | B25D 16/00 |

FOREIGN PATENT DOCUMENTS

| | | |
|---|---|---|
| DE | 29715048 U1 | 10/1997 |
| DE | 10101219 B4 | 7/2004 |
| DE | 102006000310 A1 | 1/2008 |
| DE | 202010012821 U1 | 12/2010 |
| DE | 102010029524 A1 | 12/2011 |
| DE | 102010045979 A1 | 3/2012 |
| DE | 102011015574 A1 | 10/2012 |
| DE | 102011015575 A1 | 10/2012 |
| DE | 202013011464 U1 | 1/2014 |
| DE | 102013007183 A1 | 10/2014 |
| EP | 0197036 B1 | 3/1990 |
| EP | 0674932 A2 | 10/1995 |
| EP | 1245330 | 10/2002 |
| EP | 1380246 A2 | 1/2004 |
| EP | 1477273 A1 | 11/2004 |
| EP | 1118303 B1 | 12/2005 |
| EP | 2046181 B1 | 5/2010 |
| EP | 1997415 B1 | 9/2010 |
| EP | 2046183 B1 | 9/2010 |
| EP | 1913857 B1 | 4/2011 |
| EP | 2052660 B1 | 2/2012 |
| EP | 2190335 B1 | 3/2012 |
| EP | 2517824 | 10/2012 |
| EP | 2421630 B1 | 3/2013 |
| EP | 1849555 B2 | 6/2013 |
| EP | 2606796 A2 | 6/2013 |
| EP | 1646441 B1 | 1/2014 |
| EP | 2046184 B1 | 1/2014 |
| EP | 2046182 B1 | 5/2014 |
| EP | 2612582 B1 | 7/2014 |
| EP | 2428152 B1 | 10/2014 |
| EP | 2672870 B1 | 12/2014 |
| EP | 2347690 B1 | 1/2015 |
| EP | 2630902 B1 | 5/2015 |
| EP | 2352409 B1 | 7/2015 |
| EP | 2424418 B1 | 11/2015 |
| WO | 02008154274 A2 | 12/2008 |
| WO | 2016107627 A1 | 7/2016 |

* cited by examiner

DUST COLLECTION BOX

CROSS-REFERENCE TO RELATED APPLICATIONS

This application claims priority, under 35 U.S.C. § 119, to UK Patent Application No. 17 006 37.0, filed Jan. 13, 2017, titled "Dust Collection Box".

FIELD

The present invention relates to a dust extractor for a power tool, and in particular, to a dust extractor which can clean at least part of its filter using flush back.

BACKGROUND

One type of power tool drill is a hammer drill which typically comprises an electric motor, a hammer mechanism and/or a rotary drive. The hammer drill is powered ether by an AC mains electric power supply or a battery attached to the hammer drill. A cutting tool, such as a drill bit, is supported within a tool holder mounted on the front of the hammer drill which is driven by the motor via either the rotary drive or the hammer mechanism or both to perform cutting operations. Such a hammer drill usually can operate in a hammer only mode, a drill only mode or a hammer and drill mode.

EP1157788 describes a typical example of hammer drill.

During the operation of a hammer drill, a large amount of dust can be generated. In addition to making the local vicinity dirty and clogging up the hammer drill, it can also be a health hazard to the operator of the hammer drill as the operator may breathe in the dust. As such it is desirable to collect the dust so that it can be safely disposed of.

One method of achieving this is to use a dust extractor which mounts onto the hammer drill. EP1245330 shows an example of a dust extractor.

Dust extractors are attached to the body of a hammer drill. The dust extractor comprises a main body and a shroud, typically mounted on the end of a tubular telescopic arm which is attached to the main body, and which surrounds the cutting tool and engages with the work piece being cut. The dust extractor comprises a dust collection box, a filter mounted within the dust collection box and an air suction device. Whilst the hammer drill is in use, the air suction device is switched on. During use, the dust generated by the cutting tool cutting the work piece enters the shroud. The air suction device draws the air together with dust from within shroud, through the telescopic arm into the dust collection box. The air passes then through the filter, whilst the dust is trapped by the filter within the dust collection box. The clean air is then typically expelled from the dust extractor. Once the operation of the hammer is complete, the dust extraction box can be removed from the dust extractor and the dust removed from the dust collection box and safely disposed of.

In some designs dust extractors, the air suction device can be located remotely from the body. In an example, the cooling fan of the electric motor of the hammer drill can be used as the air suction device and generate an air vacuum source which connects to the main body of the dust extractor. The air is drawn through the filter, out of the main body of the dust extractor and then into the housing of the hammer drill where it passes through the cooling fan of the hammer drill.

In alternative designs, a fan is rotatably mounted within the main body of the dust extractor adjacent the filter. The fan is rotatably driven by a motor to generate an air vacuum source and draw air from the shroud into the dust collection box and then through the filter before expelling it from the main housing. The fan can be rotatably driven by an electric motor mounted within the main housing of the dust extractor. EP1459842 discloses such a dust extractor. Alternatively, the fan can be releasably attached to the spindle of the drive motor of the hammer drill. DE4024022 discloses such a dust extractor.

One problem with existing exiting designs of dust extractors is that the filter becomes blocked. As such, the filter needs to be cleaned which is typically done manually. Therefore, access to the filter has to be provided or the filter has to be made to be removeable so that it can be manually cleaned. However, it is desirable if the cleaning process could be made to occur during the operation of the dust extractor, thus reducing the frequency with which the filter has to be accessed.

SUMMARY

The present invention provides a solution by directing an air flow back through at least part of the filter in the reverse direction.

Accordingly, there is provided a dust extractor box for a dust extractor. The dust extractor box includes first and second air inlet chambers, an air inlet aperture through which air is drawn into the first air inlet chamber, an air outlet aperture through which air is dawn out of the second air outlet chamber, an air intermediate chamber formed in the housing, and a filter mounted within the housing. The filter includes a first part through which air passes from the air inlet chamber to the air outlet chamber, and a second part through which air passes from the air inlet chamber to the air intermediate chamber. An ambient air aperture is formed in the wall of the housing. A valve disposed proximate the ambient air aperture is switchable to connect the air intermediate chamber to only one of the air outlet chamber or the ambient air aperture.

BRIEF DESCRIPTION OF THE DRAWINGS

An embodiment of the present invention will now be described with reference to the accompanying drawings of which.

DETAILED DESCRIPTION

Figure 1:
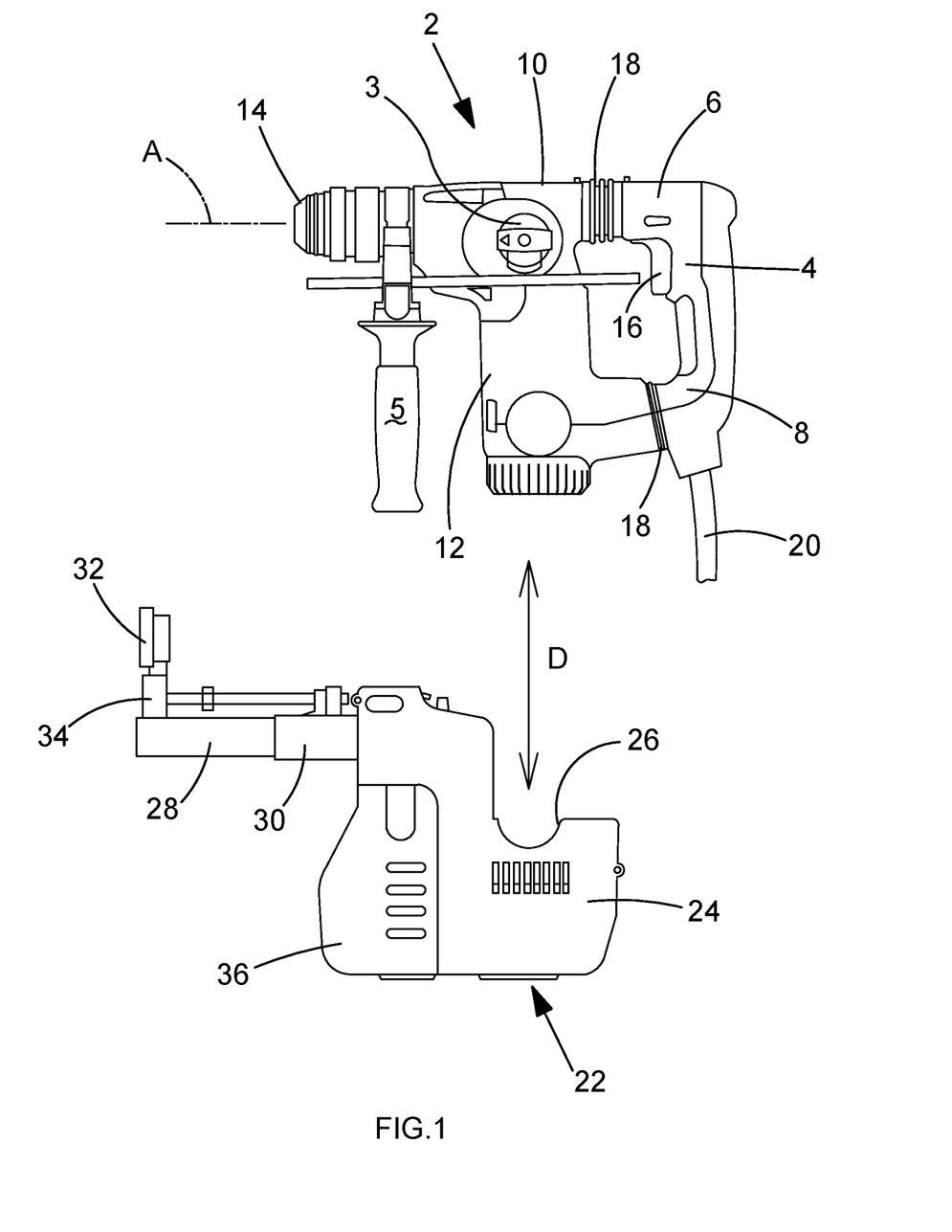
FIG. 1 shows a side view of a known design of hammer drill and known design of dust extractor.

Referring to FIG. 1, a hammer drill comprises a main housing 2 and a rear handle 4 attached to the main housing 2 via vibration dampeners 18 at its upper 6 and lower 8 ends. The main housing 2 comprises a motor housing 12, in which is mounted an electric motor (not shown), and a transmission housing 10, in which is mounted the hammer mechanism (not shown) and rotary drive (not shown). A mode change knob 3 is used to change the mode of operation of the hammer drill. A tool holder 14 is mounted on the front of the transmission housing 10 which is capably of releasably holding a cutting tool (not shown). The tool holder is cable of being rotated about axis A. A front handle 5 is attached to the transmission housing 10 behind the tool holder 14. A trigger switch 16 is mounted within the rear handle 4 by which an operator can activate the hammer drill. An electric cable 20 connects to the base of the rear handle 4 by which a mains AC electric power supply is supplied to the hammer drill.

A typical dust extractor comprises a main housing 22 manufactured from two plastic clam shells 24, 26 which are joined together about a vertical plane using screws. Mounted on the top of the main housing 22 is a telescopic tubular extension arm 28, 30. A first section 28 of the telescopic arm 30 can slide in and out of the other second section 30. A spring biases the first section 28 out of the second section 30 towards its maximum extended position.

Mounted on the end of the first section 28 remote from the main housing is a tubular support 34 and a shroud 32. A hole is formed through the shroud 32 to allow a cutting tool to pass through the shroud 32.

A dust collection box 36 releasably connects to the front of the main housing 22. A filter 102 is mounted inside of the dust collection box which connects to the main housing when the dust collection box 36 is connected to the main housing 22.

When attaching the dust extractor to the hammer drill, the dust extractor is slid in the direction of Arrow D onto the motor housing until a latch (not shown) reliably attaches the dust extractor to the motor housing 12. When the dust extractor is mounted on the hammer drill, an electrical connection is made between the dust extractor and the hammer drill so that electrical power and signals can be transmitted from the hammer drill to the dust extractor.

An embodiment of the present invention will now be described with reference to FIGS. 2 to 7. Where the same features are present in the embodiment are present in the example described with reference to FIG. 1, the same reference numbers have been used.

Referring to the FIGS. 2 to 7, the dust collection box 36 comprises a substantially rectangular plastic container 1020 having a base 1024, side walls 1026 and an angled wall 1028 which connects between the base 1024 and three of the side walls 1026. The edges of the side walls 1026 form a large aperture through which an internal cavity formed by the base 1024, side walls 1026 and an angled wall 1028 can be accessed. The large cavity can be sealed by a lid 1022 which is pivotally mounted at a pivot joint 1204 on the edge of one of the side walls 1026. The lid 1022 can pivot between an open position where the cavity can be accessed and a closed position where the large aperture is sealed.

The lid 1022 comprises three apertures, an air inlet aperture 1030, an air outlet aperture 1032 and an ambient air aperture 1034 through which air can pass when the apertures are open.

Mounted on the lid 1022 is a filter 102. The filter 102 comprises pleated filter paper 1038 which is surrounded by a rectangular rubber seal 1036. The rubber seal 1036 is mounted on a rectangular frame 1040 so that no air can pass between the frame 1040 and the seal 1036. The frame 1040 is mounted on the lid 1022 via side walls 1042 which extend the whole way around the frame 1040 between the frame 1040 and the lid 1022. An internal space 1044, 1046 is formed by filter 102, the frame 1040, the side walls 1042 and the lid 1022. The air outlet aperture 1032 and the ambient air aperture 1034 in the lid are surrounded by the frame 1040 and side walls 1042, the air outlet aperture 1032 and the ambient air aperture 1034 in the lid engaging with the internal space. Air is only capable of entering or exiting the internal space 1044, 1046 via the air out let aperture 1032, the ambient air aperture 1034 or through the pleated filter paper 1038.

Mounted on the lid 1022 in the internal space 1044, 1046, adjacent to and covering the ambient air aperture 1034, is an air valve 1048. The valve 1048 comprises a valve housing 1050 in which is formed a tubular passageway in which is mounted a rotatable air guide 1000. The ends of the valve housing are mounted on the side walls 1042 and engage with the frame 1040 and seal 1036 of the filter 102. Air is unable to move around the ends of the valve housing 1050 between the ends of the valve housing 1050 and the side walls 1042, the frame 1040 or the seal 1036. The sides of the valve housing 1050 locate between and abut against both the lid 1022 and the filter 102 in the internal space 1044, 1046, forming a barrier across the width of the internal space 1044, 1046 and separating it into two chambers, an air outlet chamber 1044 and an air intermediate chamber 1046. Air is unable to move around the side of the valve housing 1050 either between the outer surface of the side of the valve housing 1050 and the lid 1022 or between the outer surface of the side of the valve housing 1050 and the filter 102. As such, air can only pass between the intermediate chamber 1046 and the air outlet chamber 1044 by passing through the valve 1048. The air outlet aperture 1032 is formed in the lid 1022 so that it engages with the air outlet chamber 1044 of the internal space 1044, 1046.

The valve housing 1050 has three apertures, a first aligned with air outlet chamber 1044, a second aligned with the air intermediate chamber 1046 and a third aligned with the ambient air aperture 1034. Air is capable of entering or exiting the valve 1048 through any one of the three apertures.

Figure 5:
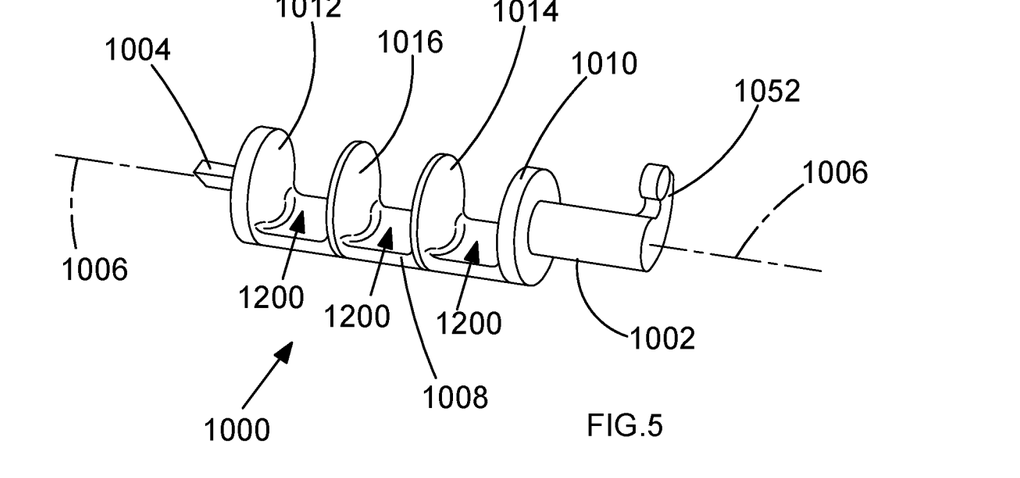
FIG. 5 shows the rotatable air guide of the valve.

The rotatable air guide 1000 comprises a first rod section 1002 of uniform circular cross section along its length and a second pin section 1004 of uniform circular cross section along its length. The longitudinal axis 1006 of the first rod section 1002 is co-axial with the longitudinal axis of the second pin section 1004. The rotatable air guide 1000 is rotatably mounted in the valve housing 1050 via the first rod section 1002 and the second pin section 1004. The rotatable air guide 1000 is capable of rotating within the valve housing 1050 around longitudinal axis 1006 of the first rod section 1002 and the second pin section 1004.

Attached to the inner end of the first rod section 1002 is a first circular disk 1010, the axis of the first disk 1010 being co-axial with the longitudinal axis 1006 of the first rod section 1002. Attached to the inner end of the second pin section 1004 is a second circular disk 1012, the axis of the second disk 1012 being co-axial with the longitudinal axis 1006 of the second pin section 1002. Interconnecting the first rod section 1002 via the first disk 1010 and the second pin section 1004 via the second disk 1012 is an intermediate section 1008 having a C shaped cross section along its length. The outer periphery of the intermediate section 1008 in cross section is circular, the periphery being curved around the longitudinal axis 1006 of the first rod section 1002 and the second pin section 1004. A third circular disk 1014 and a fourth circular disk 1016 are attached at their peripheries to the intermediate section 1008 along the length of the intermediate section 1008 equidistantly between the first and second disks 1010, 1012. The first, second, third and fourth disks, 1010, 1012, 1014, 1016 are parallel to each other, are co-axial with each other and the first rod section 1002, and have the same diameter as the periphery of the intermediate section 1008 in cross section. The spaces 1018 between the first, second, third and fourth disks, 1010, 1012, 1014, 1016 form passageways 1200 through which air can pass as described in more detail below.

Mounted on the outer end of the first rod section 1002, remote from the first disk 1010, is a cam 1052.

The rotatable air guide 1000 is made in a one piece construction from plastic material.

The rotatable air guide 1000 is rotatably mounted within the tubular passage of the valve housing 1050 and is capable of rotating between two positions.

In the first position, the rotatable air guide 1000 is angularly positioned so that the passageways 1200 between the first, second, third and fourth disks, 1010, 1012, 1014, 1016 connect between the first aperture of the valve housing 1050 aligned with the air outlet chamber 1044 and the second aperture of the valve housing 1050 aligned with the air intermediate chamber 1046. In the first position, the intermediate section 1008 covers the third aperture of the valve housing 1050 to seal it. As such, when the rotatable air guide 1000 is in its first position, air can flow freely between the air outlet chamber 1044 and the air intermediate chamber 1046. No air is able to pass through the ambient air aperture 1034 as the third aperture of the valve housing 1050 is sealed by the intermediate section 1008 of the rotatable air guide 1000.

In the second position, the rotatable air guide is angularly positioned so that the passageways 1200 between the first, second, third and fourth disks, 1010, 1012, 1014, 1016 connect between the second aperture of the valve housing 1050 aligned with the air intermediate chamber 1046 and the third aperture of the valve housing 1050 aligned with the ambient air aperture 1034. In the second position, the intermediate section 1008 covers the first aperture of the valve housing 1050 to seal it. As such, when the rotatable air guide 1000 is in its second position, air can flow freely between the air intermediate chamber 1046 and the ambient air aperture 1034. No air is able to pass into or out off the air outlet chamber 1044 as the first aperture of the valve housing 1050 is sealed by the intermediate section 1008 of the rotatable air guide 1000.

Mounted in a slideable manner on a side wall 1026 of the rectangular plastic container 1020 is a slider 1060 which is capable of sliding between a first forward position and a second rearward position. The slider 1060 comprises a finger pad 1062 by which an operator can manually slide the slider 1060 between its first and second positions. The slider 1060 further comprises an elongate bar 1064 which extends rearwardly. When the slider 1060 slides between its first and second positions, the elongate bar 1064 slides in a direction substantially parallel to its longitudinal axis. A spring 1066 is sandwiched between slider 1060 and a surface formed on the side wall 1026 of the container 1020.

The spring 1066 is made from two plastic resilient strings 1068 which are each arranged in a wave like manner, the undulations of which extend in a plane parallel to the plane of the side wall of the container 1020 on which the slider 1060 is mounted. The peaks 1070 and troughs 1072 of the waveforms of the strings 1068 co-inside with the troughs 1072 of the strings 1068 being connected together to form diamond shaped apertures 1074 surrounded by the strings 1068 between each set of adjacent troughs 1072. The spring 1066 compresses and expands within the plane of the undulations of the strings 1068, the length and width of the diamond apertures 1074 expanding and contracting as it is does so. The spring 1066 is made as a once piece construction and is integrally formed with and connected to the slider 1060.

The spring 1066 is compressed between the slider 1060 and the surface and therefore is subject to a compressive force. The spring 1066 biases the slider 1060 towards its first forward position.

When the lid 1022 is pivoted to its closed position to seal the large aperture of the container 1020, the filter 102, the frame 1040, the side walls 1042 which connect between frame 1040 and the lid 1022, and the valve 1048 locate inside of the internal cavity of the container 1020. This results in the air outlet chamber 1044 and the air intermediate chamber 1046 being located inside of the cavity. The remainder of the space within the cavity which surrounds the filter 102, the frame 1040, the side walls 1042 which connect between the frame 1040 and the lid 1022, and the valve 1048 forms another chamber referred to as the air inlet chamber 1202. The air inlet aperture 1030 formed in the lid 1022 engages with the air inlet chamber 1202. Air can only pass between the air inlet chamber 1202 and both of the air outlet chamber 1044 and the air intermittent chamber 1046 of the internal space by passing through the filter 102.

Furthermore when the lid 1022 is pivoted to its closed position to seal the large aperture of the container, the end of the elongate bar 1064 locates in close proximity to and engages with the cam 1052 of the rotatable air guide 1000. When the slider 1060 is in its forward position, the cam 1052 is moved clockwise (see FIG. 6C) with the elongate bar 1064 to move the rotatable air guide 1000 to its first position. When the slider 1060 is slid rearwardly against the biasing force of the spring 1066 to its second position, the cam 1052 is moved anti-clockwise (see FIG. 7C) by the end of the elongate bar 1064 which in turn rotates the rotatable air guide 1000 to its second position. As such, movement of the slider 1060 between its first and second positions rotates the rotatable air guide 1000 between its first and second positions respectively. The rotatable air guide 1000 is urged towards its first position by air flow or other means (eg gravity) during the normal operation of the dust extractor.

An additional biasing mechanism (not shown) such as a spring can be mounted on the lid 1022 which biases the rotatable air guide 1000 toward its first position to aid the rotational movement of the rotatable air guide 1000. If such a biasing mechanism is used, the reliance on an air flow or other means to urge the movement of the rotatable air guide can be omitted. If the strength of the additional biasing mechanism is sufficient, the spring 1066 which biases the slider 1060 forward, may be omitted from the design.

The filter 102 is separated into two parts 1080, 1210 along a glued split line 1212, each part acting as a separate filter. This results in air being only able to pass through filter by passing through one part only. The split line aligns with the valve 1050. As such air can only pass through a top part 1080 of the filter 102 between the air inlet chamber 1202 and the air intermediate chamber 1046 and through a bottom part 1210 between the air inlet chamber 1202 and the air outlet chamber 1044. A person skilled in the art however, will appreciate that that though the use of a glued split line 1212 may be desirable for the improved operation of the invention, it is not a requirement for the invention to function.

Figure 2:
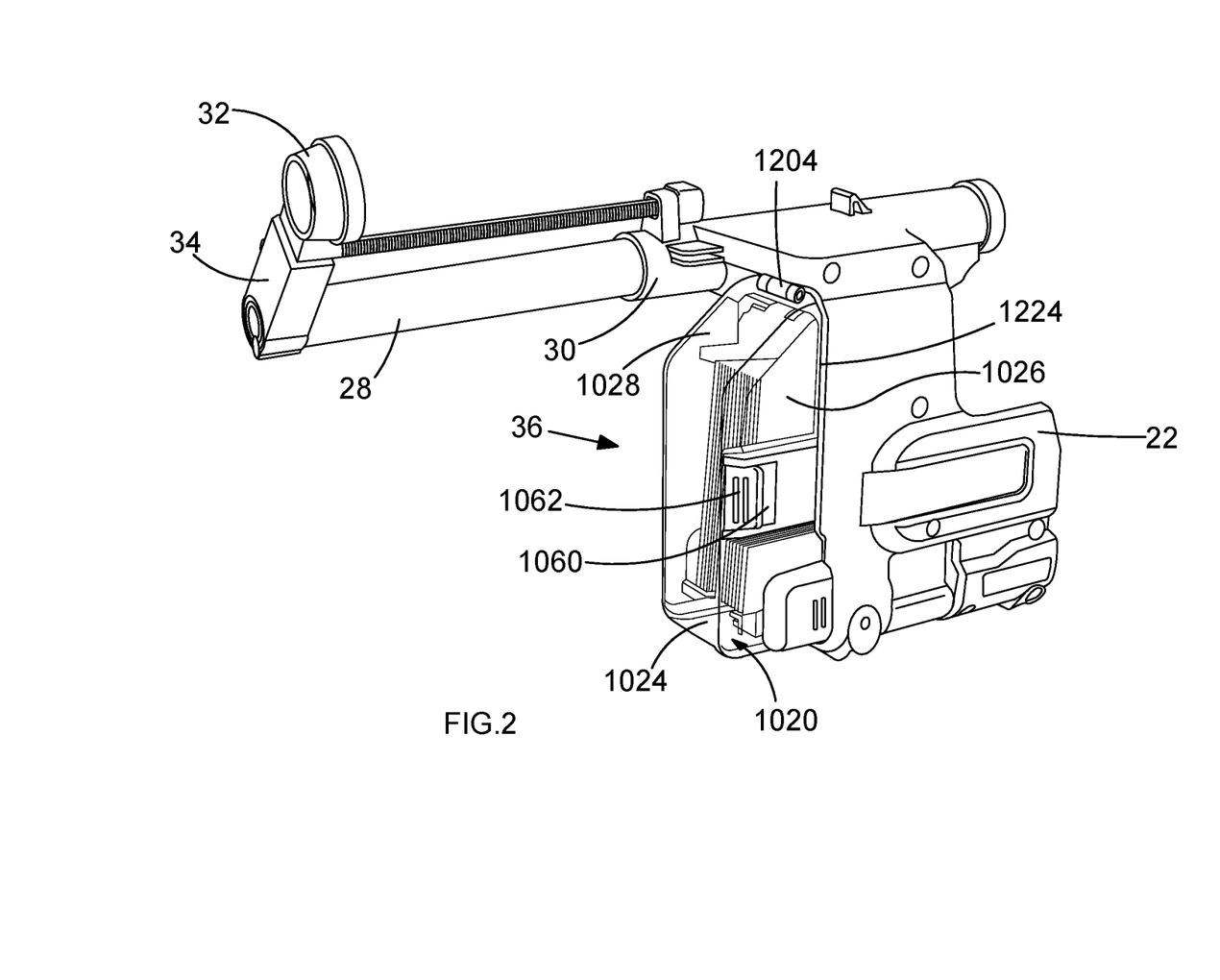
FIG. 2 shows a perspective view of a dust extractor according to present invention.
Figure 3:
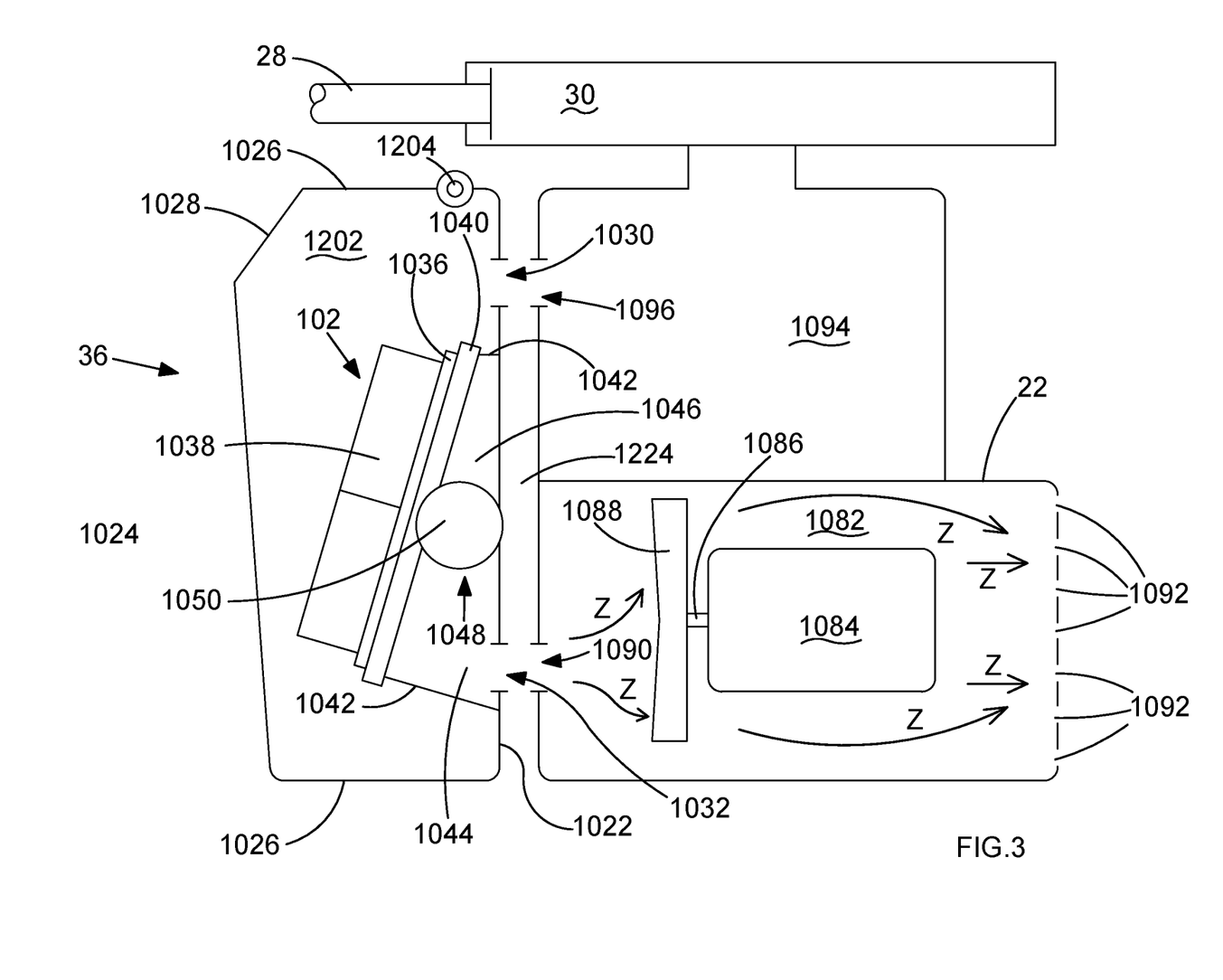
FIG. 3 shows a schematic diagram of a vertical cross section of the dust extractor of FIG. 2.
Figure 4A:
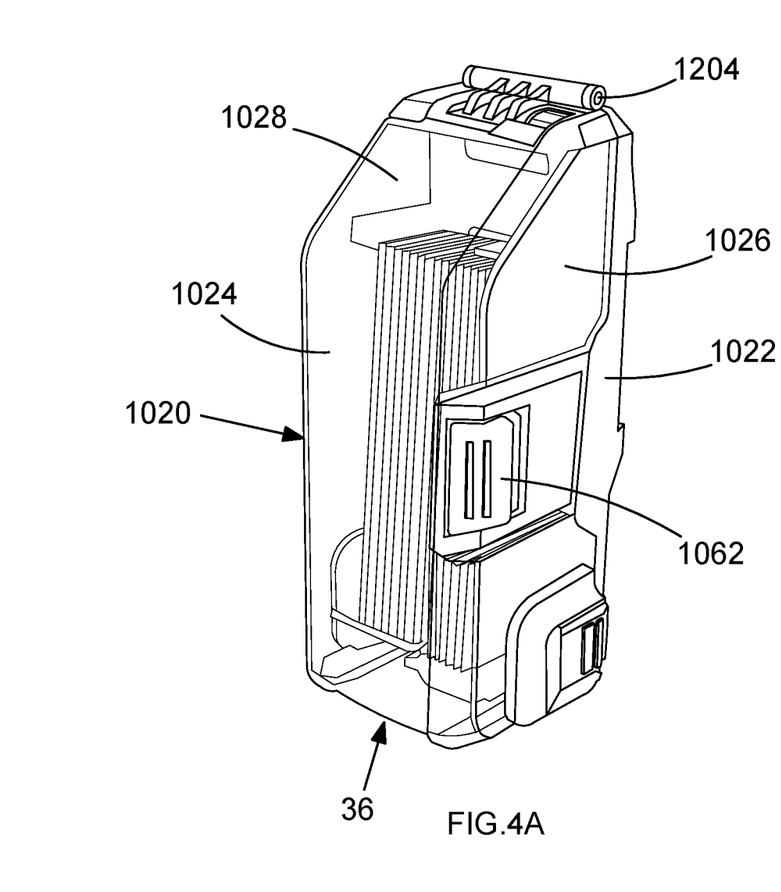
FIG. 4A shows a front perspective view of the dust collection box 36 according to FIG. 2.
Figure 4B:
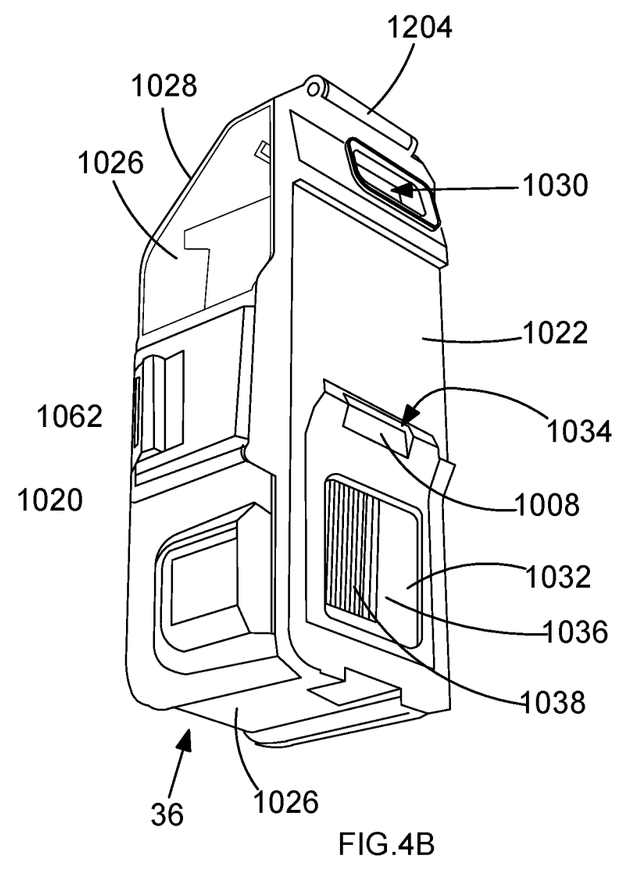
FIG. 4B shows a rear perspective view of the dust collection box 36 according to FIG. 2.

As can be seen in FIG. 2, the main housing 22 of the dust extractor comprises a socket for receiving the dust collection box 36.

A motor chamber 1082 is formed inside of the main housing 22 in which is mounted an electric motor 1084. The electric motor 1082 is powered by an electrical power source provided by a hammer drill when the dust extractor is mounted on the hammer drill. Activation of the motor 1084 is controlled by a control circuit within the hammer drill which operates it in combination with the operation of the hammer drill. The motor 1084 comprises an output shaft 1086 on which is mounted an axial fan 1088. Formed in the wall of the main housing 22 in one end of the motor chamber 1082 is an air entry aperture 1090. Formed in the wall of the main housing in the opposite end of the motor chamber 1082 is a number of air holes 1092. When the motor 1082 is activated, the output shaft 1086 and fan 1088 rotate. As the fan 1088 rotates, it moves air in the direction of Arrows Z, drawing air through the air entry aperture 1090 into the motor chamber 1082, along the motor chamber 1082, the air passing over or through the motor 1082 as it does so, and blowing it out of the motor chamber 1082 through the air holes 1092 and into ambient air surround the dust extractor.

An air reception chamber 1094 is formed in the main housing 22 above the motor chamber 1082. The air reception chamber 1094 is in fluid connection with the passage inside of telescopic tubular arm 28, 30 so that air and debris can pass from the telescopic tubular arm into the air reception chamber 1094. Formed in the wall of the main housing 22 in the air reception chamber 1094 is an air exit aperture 1096 through which air can exit the air reception chamber 1094.

When the dust collection box 36 is attached to main housing 22 within the socket, the air outlet aperture 1032 of the dust collection box 36 aligns with the air entry aperture 1090 of the main housing 22. When the dust collection box 36 is attached to main housing 22 within the socket, the air inlet aperture 1030 of the dust collection box 36 aligns with the air exit aperture 1096 of the main housing 22.

When the dust collection box 36 is attached to main housing 22 within the socket, the ambient air aperture 1034 aligns with a gap 1224 formed between the dust collection box 36 and the main housing 222. The gap 1224 connects with ambient air surrounding the dust extractor. As such the air can pass between the valve 1048 and the ambient air via the ambient air aperture 1034 and the gap 1224.

During operation of the dust extractor, the dust collection box 36 is attached to the main housing of the dust extractor, and then the dust extractor is attached to a hammer drill in well-known manner.

Figure 6A:
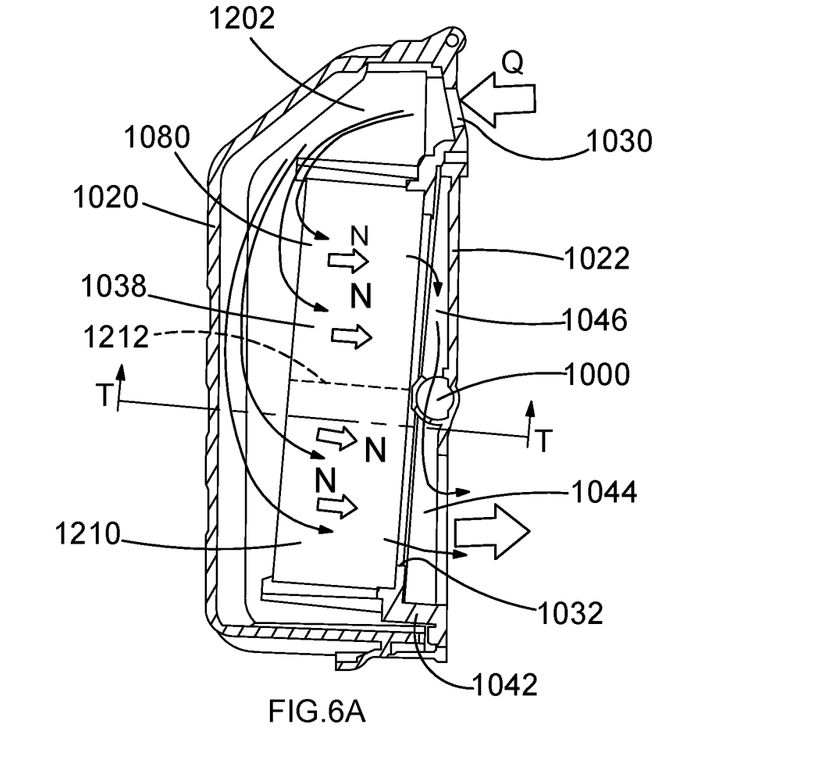
FIG. 6A shows a vertical cross section of the dust collection box 36 when the air is passing through it during the normal operation of the dust extractor.
Figure 6B:
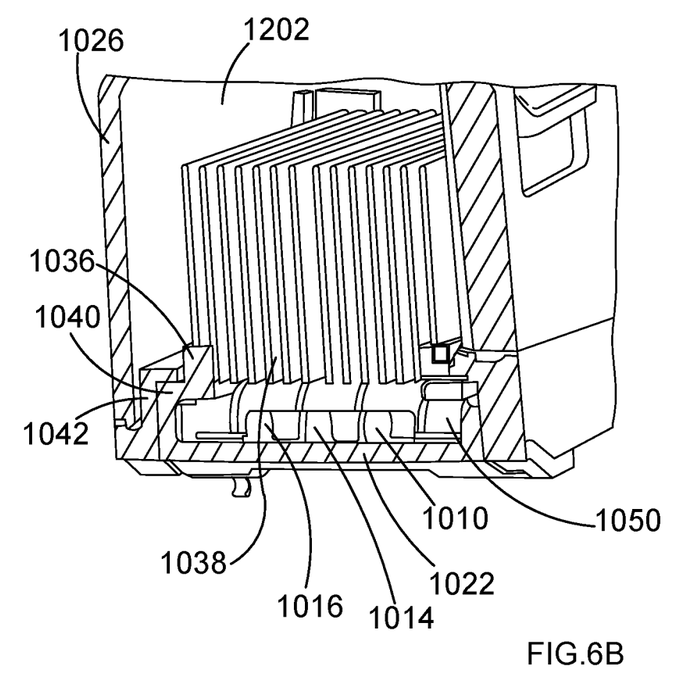
FIG. 6B shows a horizontal cross section of the dust collection box 36 in the direction of Arrows T in FIG. 6A.
Figure 6C:
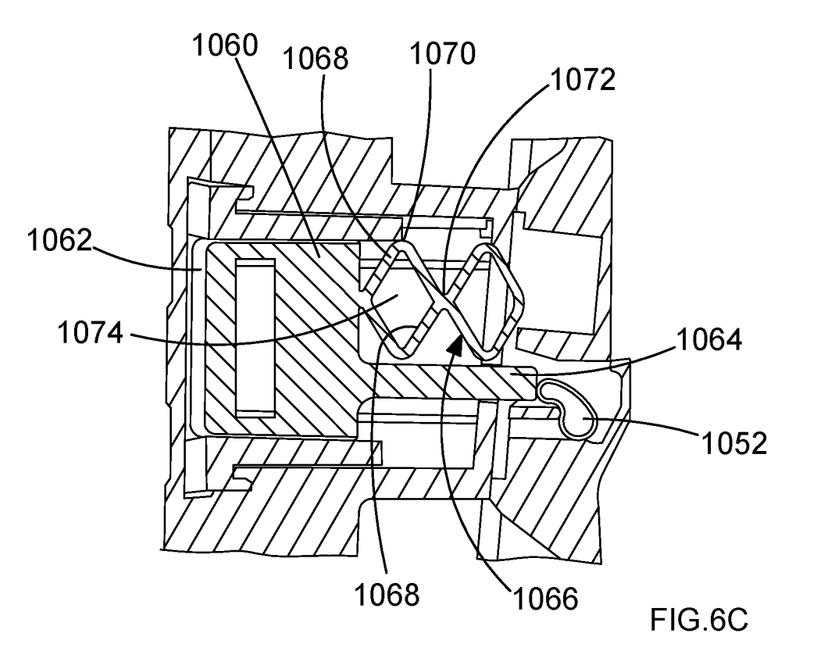
FIG. 6C shows a vertical cross section of the slider and spring when the air is passing through it during the normal operation of the dust extractor as shown in FIG. 6A.
Figure 7A:
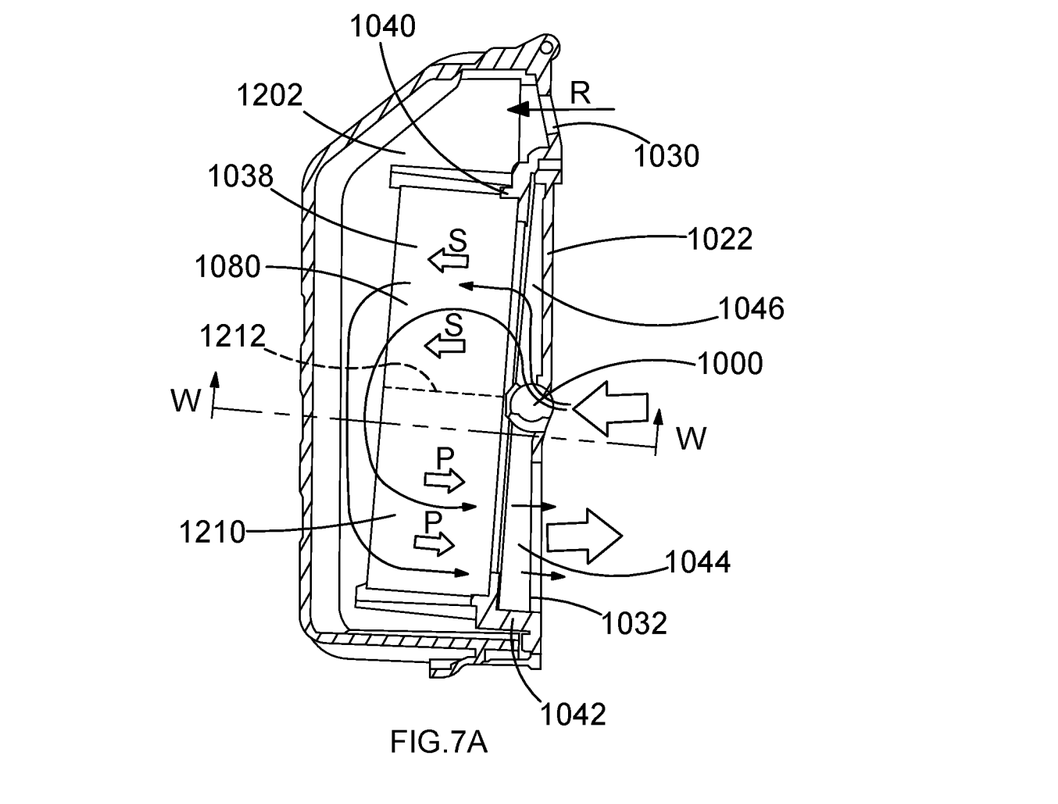
FIG. 7A shows a vertical cross section of the dust collection box 36 when the air is passing through it during the backflush operation of the dust extractor.
Figure 7B:
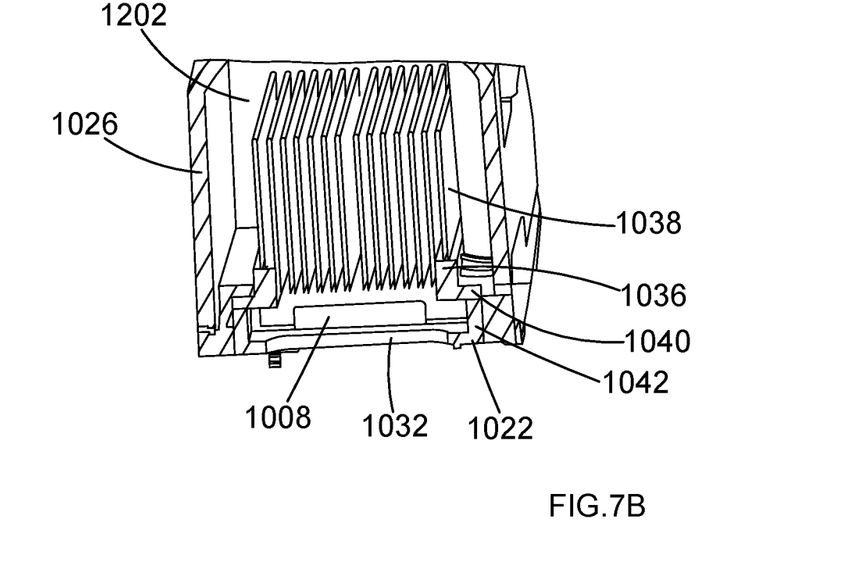
FIG. 7B shows a horizontal cross section of the dust collection box 36 in the direction of Arrows W in FIG. 7A.
Figure 7C:
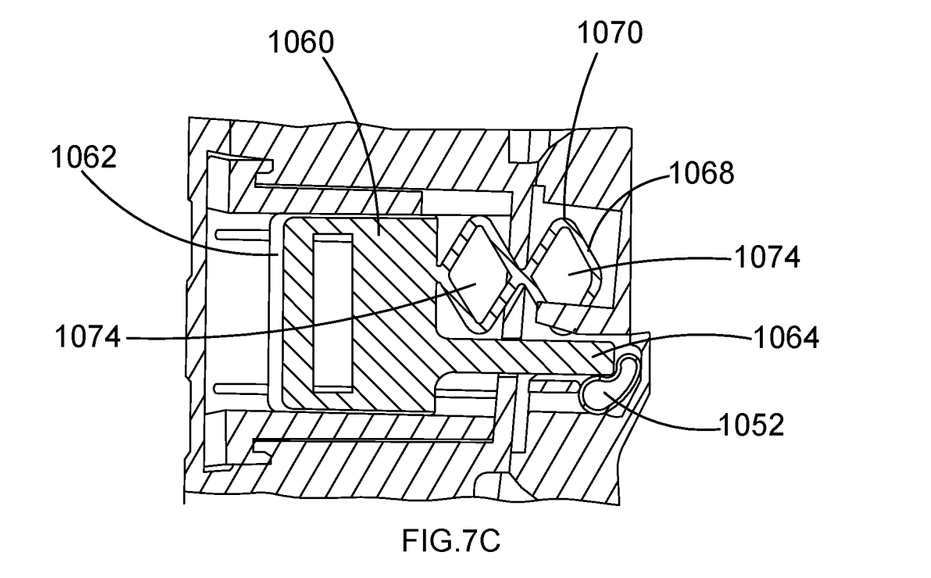
FIG. 7C shows a vertical cross section of the slider and spring when the air is passing through it during backflush as shown in FIG. 7A.
Figure 7D:
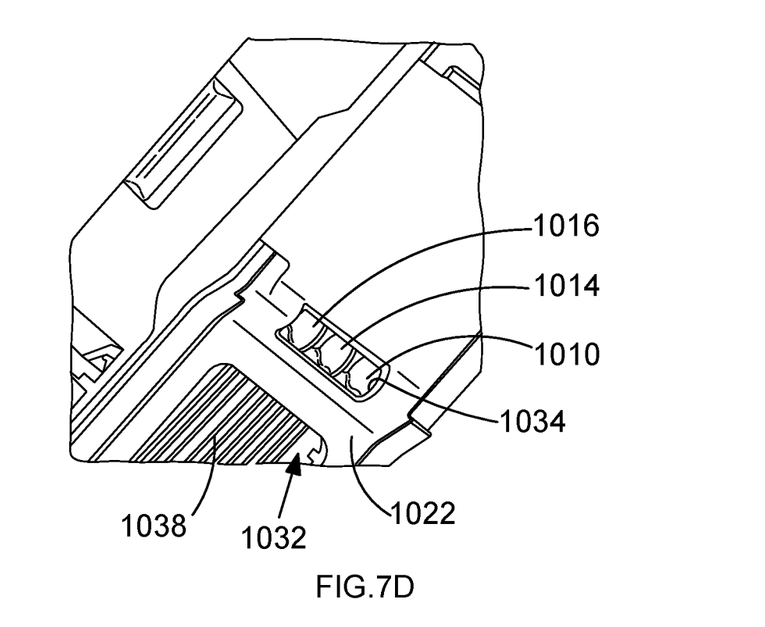
FIG. 7D shows a rear perspective view of the dust collection box 36 when the rotatable air guide is rotated to a position for backflush.

During normal operation, the slider 1060 is in its first forward position due to the biasing force of the spring 1066 and the rotatable air guide 1000 is in its first position with air being able to flow freely between the air outlet chamber 1044 and the air intermediate chamber 1046 whilst air is prevented from passing through the ambient air aperture 1034 (see FIGS. 6A to 6C). The motor 1084 is activated, resulting in the rotation of the fan 1088. The rotating fan 1088 moves air in the direction of Arrows Z, drawing air through both the air outlet aperture 1032 of the dust collection box 36 and the air entry aperture 1090 of the main housing 22. This reduces the air pressure in both the air outlet chamber 1044 and the air intermediate chamber 1046 as the two chambers are connected to each other via the valve 1048 which allows free movement of air between the two chambers. As such air is drawn through both parts 1080, 1210 of the filter 102 in the direction of Arrows N. This reduces the air pressure in the air inlet chamber 1202 which results in air being drawn from the air reception chamber 1094 of the main housing 22 through both the air inlet aperture 1030 of the dust collection box and the air exit aperture 1096 of the main housing 22 (Arrow Q). Air is subsequently drawn into the air reception chamber 1094 from the telescopic tube 28, 30 in well-known manner. As air passes through both parts 1080, 1210 of the filter 102, any debris entrained in the air is caught in one of the parts 1080, 1210 of the filter as the air passes through the parts of the filter in the same direction.

During backflush, the operator slides the slider 1060 back to its second rearward position against the biasing force of the spring 1066 whilst the motor 1084 is activated. This results in the rotatable air guide 1000 being moved from its first position to its second position with air being able to flow freely between the ambient air aperture 1032 and the air intermediate chamber 1046 whilst air is prevented from passing from the air intermediate chamber 1046 through to the air outlet chamber 1044 (see FIGS. 7A to 7D). The activated motor 1084 results in the rotation of the fan 1088. The rotating fan 1088 moves air in the direction of Arrows Z, drawing air through both the air outlet aperture 1032 of the dust collection box 36 and the air entry aperture 1090 of the main housing 22. This reduces the air pressure in the air outlet chamber 1044 only. As such, air is drawn through the lower part 1210 of the filter 102 only in the direction of Arrows P. This reduces the air pressure in the air inlet chamber 1202 which results in air being drawn from the air reception chamber 1094 of the main housing 22 through both the air inlet aperture 1030 of the dust collection box 36 and the air exit aperture 1096 of the main housing 22 (Arrow R). However, as the air intermediate chamber 1046 is connected to ambient air via the valve 1048 and the gap 1224, the air pressure in the air intermediate chamber 1046 is higher than that of the air inlet chamber 1202. As such, air passes through the upper part 1080 of the filter in the opposite direction (Arrows S) to the lower part 1210 of the filter from the intermediate chamber 1046 to the air inlet chamber 1202. As air passes through the upper part 1080 of the filter from the intermediate chamber 1046 to the air inlet chamber 1202, it blows off any debris trapped on the upper part of the filter and into the air inlet chamber 1202. As such, the upper part 1080 of the filter is cleaned during backflush. Air drawn from the intermediate chamber 1046 is replaced by ambient air drawn into the air intermediate chamber 1046 via the gap 1224 and the valve 1048

During backflush, air continues to be drawn into the air reception chamber 1094 from the telescopic tube 28, 30 in well-known manner and therefore operation of the dust extractor continues. As air passes through the lower part 1210 of the filter 102, any debris entrained in the air is caught by lower part 1210 of the filter. This may include debris previously trapped on the upper part 1080 which is being cleaned during backflush.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A dust collection box for a dust extractor comprising:
    a housing having a plurality of walls including a rear wall, a front wall, and two side walls extending from the rear wall to the front wall;
    an air inlet chamber formed within the housing;
    an air inlet aperture formed in at least one of the plurality of walls of the housing, wherein air is drawn through the air inlet aperture into the air inlet chamber;
    an air outlet chamber formed within the housing;
    an air outlet aperture formed in at least one of the plurality of walls of the housing, wherein air is drawn through the air outlet aperture out of the air outlet chamber by a vacuum source;
    an air intermediate chamber formed in part by the rear wall of the housing and located within the housing;
    a filter mounted within the housing, the filter including a first part through which air passes from the air inlet chamber to the air outlet chamber, and a second part through which air passes from the air inlet chamber to the air intermediate chamber;
    a valve located between the air intermediate chamber and the air outlet chamber; and
    an ambient air aperture formed in the rear wall of the housing adjacent a part of the rear wall of the housing that forms the air intermediate chamber and in communication with the valve, the ambient air aperture arranged to receive ambient air in communication with the valve;
    wherein the valve is switchable between a first position, where air passes from the air intermediate chamber to the air outlet chamber and the valve substantially seals the ambient air aperture, and a second position, where air passes from the ambient air aperture to the air intermediate chamber and the valve substantially seals passage of air from the air intermediate chamber to the air outlet chamber.

2. The dust collection box of claim 1, wherein the valve comprises:
    a valve housing having a first aperture, a second aperture and a third aperture, the first aperture being connected to air outlet chamber, the second aperture being connected to the air intermediate chamber, and the third aperture being connected to the ambient air aperture; and
    a rotatable air guide rotatably mounted within the valve housing and comprising a at least one air passageway;
    wherein the rotatable guide is rotatable between two positions within the valve housing to switch the valve between the first position and the second position,
    wherein in the first position the at least one air passageway connects between the first aperture and the second aperture to allow passage of air from the air intermediate chamber to the air outlet chamber whilst sealing the third aperture to prevent air communication between the valve and the ambient air aperture, and
    wherein in the second position the at least one air passageway connects between the second aperture and the third aperture to allow passage of air from the ambient air aperture to the air intermediate chamber whilst sealing the first aperture to prevent air communication between the valve and the air outlet chamber.

3. The dust collection box of claim 2, wherein the rotatable air guide comprises:
    a first rod section interconnected to a second pin section via an intermediate section, the rotatable air guide being rotatably mounted in the valve housing by the first rod section and second pin section; and
    a plurality of plates mounted on and extending perpendicular to the intermediate section, wherein gaps between adjacent plates form the at least one passageway;
    wherein, in the first position, the gaps formed between adjacent plates connect between the first aperture and the second aperture whilst the intermediate section seals the third aperture, and in the second position, the gaps formed between adjacent plates connect between the second aperture and the third aperture whilst the intermediate section seals the first aperture.

4. The dust collection box of claim 1, wherein the housing comprises a container with a releasable lid.

5. The dust collection box of claim 4, wherein at least one of the air outlet chamber and/or the air intermediate chamber is formed on the lid.

6. The dust collection box of claim 4, wherein at least one of the air inlet aperture, air outlet aperture and/or the ambient air aperture is formed through the lid.

7. The dust collection box of claim 4, wherein the valve is mounted on the lid between the between the air outlet chamber and air intermediate chamber.

8. The dust collection box of claim 4, wherein the filter is mounted on the lid adjacent the air outlet chamber and the air intermediate chamber.

9. The dust collection box of claim 1, wherein the filter comprises pleats separated into at least two parts by a glued split line.

10. The dust collection box of claim 1, wherein the first part of the filter is located between the air inlet chamber and the air outlet chamber and the second part of the filter is located between the air inlet chamber and the air intermediate chamber.

11. The dust collection box of claim 10, wherein the first part of the filter forms part of a first wall, said first wall defines both the air inlet chamber and of the air outlet chamber, and the second part of the filter forms part of a second wall, said second wall defines both the air inlet chamber and of the air intermediate chamber.

12. The dust collection box of claim 1, further comprising a spring that urges the valve towards its first position.

13. The dust collection box of claim 12, wherein the valve comprises a rotatable air guide, wherein the spring urges the rotatable air guide towards its first position.

14. The dust collection box of claim 1, further comprising a slider mounted on the housing manually slideable between a first position and a second position on the housing;
wherein the slider interacts with the valve so that when the slider is manually slid to its first position it switches the valve to its first position, and when the slider is manually slid to its second position it switches the valve to its second position.

15. The dust collection box of claim 14, further comprising a spring that urges the slider towards its first position.

16. The dust collection box of claim 15, wherein the spring is formed from two resilient strings arranged in a wave-like manner with their undulations extending in a plane, wherein peaks and troughs of each string are aligned with peak and troughs of the other string, the troughs of the two strings being connected together to form diamond-shaped apertures, the spring compressing and expanding within plane.

17. The dust collection box of claim 15, wherein the spring is integrally formed with the slider.

18. The dust collection box of claim 14, wherein the valve comprises a rotatable air guide having a cam, the slider comprises an elongate bar, and an end of the elongate bar interacts with the cam of the rotatable air guide so that a movement of the slider results in a movement of the rotatable air guide via the elongate arm and cam.

19. The dust collection box of claim 15, wherein the housing comprises a container with a releasable lid, and at least one of the slider and/or the spring is mounted on the container.

20. The dust collection box of claim 1, wherein the first part of the filter is positioned along a plane, the air received through the first part of the filter traveling traversely to the plane, and wherein the plane intersects the second part of the filter.

21. The dust collection box of claim 1, wherein the air outlet aperture is also formed in the rear wall of the housing, and wherein the ambient air aperture is formed between the air outlet aperture and the part of the rear wall of the housing that forms the air intermediate chamber.

22. A dust extractor for a power tool comprising a dust collection box, wherein the dust collection box comprises:
a housing having a plurality of walls including a rear wall, a front wall, and two side walls extending from the rear wall to the front wall;
an air inlet chamber formed within the housing;
an air inlet aperture formed in at least one of the plurality of walls of the housing, wherein air is drawn through the air inlet aperture into the air inlet chamber;
an air outlet chamber formed within the housing;
an air outlet aperture formed in at least one of the plurality of walls of the housing, wherein air is drawn through the air outlet aperture out of the air outlet chamber by a vacuum source;
an air intermediate chamber formed in part by the rear wall of the housing and located within the housing;
a filter mounted within the housing, the filter including a first part through which air passes from the air inlet chamber to the air outlet chamber, and a second part through which air passes from the air inlet chamber to the air intermediate chamber;
a valve located between the air intermediate chamber and the air outlet chamber; and
an ambient air aperture formed in the rear wall of the housing adjacent a part of the rear wall of the housing that forms the air intermediate chamber and in communication with the valve, the ambient air aperture arranged to receive ambient air in communication with the valve;
wherein the valve is switchable between a first position, where air passes from the air intermediate chamber to the air outlet chamber and the valve substantially seals the ambient air aperture, and a second position, where air passes from the ambient air aperture to the air intermediate chamber and the valve substantially seals passage of air from the air intermediate chamber to the air outlet chamber.

* * * * *